United States Patent Office 3,424,783
Patented Jan. 28, 1969

3,424,783
AMINONITRILE SYNTHESIS
James L. Harper, Laurel, and David A. Daniels, Baltimore, Md., assignors to W. R. Grace & Co., a corporation of Connecticut
No Drawing. Filed May 6, 1966, Ser. No. 548,329
U.S. Cl. 260—465.5     6 Claims
Int. Cl. C07c *121/42, 121/02*

ABSTRACT OF THE DISCLOSURE

This invention is directed to a process for preparing aminonitriles from compounds having the formulas

and

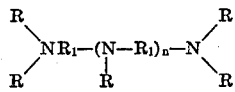

wherein R represents a hydrogen, alkyl, phenyl, alkylphenyl, phenylalkyl, hydroxyalkyl and cycloalkyl group and wherein $n$ is a number from 0 to 20 by reacting said compound in an aqueous medium with an excess of formaldehyde and HCN based on the amine in the presence of an acidic ion exchange resin, separating and recovering the thus formed aminonitrile, all as recited hereinafter.

---

The present invention relates to the production of aminonitriles and more specifically to a novel procedure for producing aminonitriles from an amine, formaldehyde, and hydrogen cyanide in acid medium.

It is generally known that aminonitriles such as ethylenediamine tetraacetonitrile may be produced by reacting an amine, such as ethylenediamine with formaldehyde and hydrogen cyanide (HCN) under precisely controlled reaction conditions in strongly acid media. Typical prior art procedures disclose that sulfuric acid may be used to provide the required acid medium.

It has been found that while aqueous sulfuric acid solutions are satisfactory from the standpoint of supplying the required condition for aminonitrile synthesis, sulfuric acid solutions are frequently difficult to handle in the large volumes used in commercial operations.

It is therefore an object of the present invention to provide an improved method for providing or producing aminonitriles.

It is another object to provide a method for producing aminonitriles from an amine, formaldehyde, and HCN which does not require large quantities of aqueous acid solutions.

These and still further objects of the present invention will become readily apparent to one skilled in the art from the following detailed description and specific examples.

Broadly, our invention contemplates a procedure for preparing aminonitriles which comprises reacting an amine, formaldehyde, and HCN in the presence of an aqueous slurry of an acidic ion exchange resin.

More specifically, we have found that substantially quantitative yields of aminonitriles may be readily obtained from a given amount of amine when an amine having a least one replaceable hydrogen atom (including ammonia and precursors thereof such as hexamethylenetetramine) is reacted with an excess of formaldehyde and HCN in the presence of an aqueous slurry of an acidic ion exchange resin at a temperature of from about 0 to about 150° C.

During the course of the reaction, the aminonitrile produced readily precipitates from the reaction mixture and may be easily separated therefrom. The solid particulate ion exchange resin is substantially unaffected during the course of the reaction and may be reused in subsequent reactions which are conducted on either a batch or continuous basis.

The present synthesis provides a suitable route for numerous nitriles which have heretofore been prepared by conventional procedures. During the course of the reaction, the following reaction takes place wherein ethylene diamine is used to illustrate the reaction of an amine which results in the formation of ethylene diamine tetraacetonitrile.

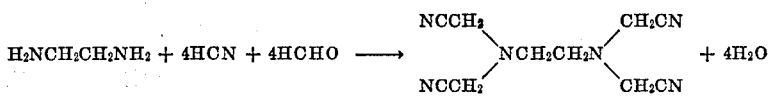

The aminonitriles produced by way of the above reaction are those which are the derivatives of amines which possess at least one replaceable hydrogen atom. In other words, the amines used in the present synthesis must possess an amino substituent which is either primary or secondary in character. Furthermore, it is contemplated that ammonia, which possesses three substitutable or replaceable hydrogen atoms, may be utilized in the present synthesis. As a convenient source of ammonia hexamethylene tetramine which is technically a tertiary amine may be conveniently used.

Typical general structures of amines which may be used in the practice of the present invention, as as follows:

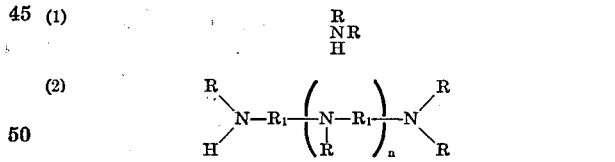

In the above formulae R may represent hydrogen, alkyl, phenyl, alkylphenyl, phenylalkyl, hydroxyalkyl or cycloalkyl. $R_1$ may represent alkylene or phenylene. In formula 2 above $n$ may represent a value of from about 0 to 20.

Specific examples of amines which may be readily used in the present method are ammonia, ethylenediamine, diethylene triamine, triethylene tetramine, propylene diamine, dipropylene triamine, tripropylene tetramine, benzylamine, 1,2-cyclohexene diamine, 1,2-cyclopentenyl diamine, hydroxy ethyl ethylene diamine, and N,N'-di(hydroxyethyl)ethylenediamine, aniline, toluidine, meta-hydroxy aniline and hexamethylenetetramine which may serve as a source of ammonia in the present reaction.

The formaldehyde utilized in the practice of the present invention may be the commercially available 37% aqueous solution of formaldehyde or the formaldehyde may be derived from other sources such as paraformaldehyde or hexamethylenetetramine. The HCN reactant used in the present synthesis may be obtained from any suitable commerical source and is normally introduced into the reaction system as a liquified gas or aqueous solution thereof.

Acidic ion exchange resins used in the practice of the present invention are preferably of the cationic synthetic organic resin type. Typical synthetic resins and ion exchange resins suitable for use in this invention are the weakly acidic carboxylic (such as polymethacrylic) type cation exchange resins, and the strongly acid sulfonated polystyrene type cation exchange resins.

In addition to synthetic acidic ion exchange resins, numerous naturally occuring and man-made inorganic cation exchange materials may be used. Typical examples of inorganic cation exchange materials which may be used in their acid form are alumina, silica-alumina, silica-magnesia, silica-zirconia, titania, zeolite (particularly in the $H^+$ or $NH_4^+$ form), bentonite, kaolin, kieselguhr, montmorillonite, phlogopite and vermiculite.

In conducting the present reaction, it is generally preferred that the formaldehyde and HCN reactants both be present in excess of that stoichiometric amount required to react with the amine reactant. Generally speaking, it is found that superior results are obtained when both the formaldehyde and HCN components are present in amounts which represent at least a 20% mole excess of that required to react with the amine. It is contemplated however, that the present reaction may be conducted using as little as 1% excess. However, the preferred larger amounts yield a product having greater purity.

The present reaction is conducted in a reaction media which comprises water and an acidic ion exchange resin. Preferably the aqueous media is utilized in amounts of from about 1 to about 3 volumes per volume of combined amine formaldehyde and HCN reactants. The amount of acidic ion exchange resin present in the reaction media may vary from about 0.1 to about 4 equivalents of acid substituents per equivalent of amine present.

During the course of the reaction, the mixture is preferably maintained at a temperature of from about 0 to about 100° C. Using temperatures falling within this range, a given reaction will generally reach completion in from about 30 to about 500 minutes.

Subsequent to reaction, the acetonitrile formed may be readily recovered using standard decantation or filtration techniques. In many instances, it is found that the aminonitrile product possesses a density less than that of the media and will rise to the top of the reaction chamber during the reaction. This characteristic in many instances simplifies the recovery of the aminonitrile. During the course of the reaction, the reaction is placed under conditions of agitation so as to disperse the acid ion exchange resin uniformly throughout the body of reactants. Upon termination of the agitation the acid ion exchange resin will frequently sink to the bottom of the reaction vessel and hence may be readily recovered therefrom.

It is often found that due to the fact that the preferred products rise to the top during the course of the reaction and the ion exchange resin catalyst sinks to the bottom, the present method is particularly adaptable to continuous or semicontinuous operation.

The aminonitrile products obtained during the present reaction possess a high degree of purity and may be readily hydrolyzed to form the corresponding acid derivatives. The hydrolysis reaction may be conducted by way of any well known techniques such as reaction with sodium hydroxide at temperatures ranging from about 10 to about 100° C. The resultant acid derivatives are utilized for many purposes including chelating agents and chemical intermediates.

Having described the basic aspects of the present invention the following examples are given to illustrate specific embodiments thereof.

EXAMPLE I

One liter of an aqueous solution containing 25.2 g. of ethylenediamine was reacted with 390 ml. (wet volume) of sulfonated ion exchange resin (Amberlite IR–120) to form the amine salt thereof. This ion exchange resin salt was then combined with 268.3 ml. of 37.3% formalin and 90.6 g. of liquid hydrogen cyanide in a reaction flask. The temperature in the flask was raised from 16° C. to 32° C. and maintained thereat for 30 minutes. A white crystalline solid formed during this period which was identified as ethylenediamine tetraacetonitrile (M.P. 134–135°). After additional heating at 43° C. for 8 hours a 96.6% yield (based on amine) of product was obtained.

EXAMPLE II

Formaldehyde (121 grams of 37.3% solution, 1.5 moles) and hydrogen cyanide (40.5 grams, 1.5 moles) were placed in a flask equipped with a thermometer, pH probe, reflux condenser, and stirrer. An aqueous solution of ethylenediamine (15 grams, 0.25 mole) was first reacted with an equivalent amount of polymethacrylate ion change resin (Amberlite, IRC–50) and the salt so formed was added, in one batch, to the stirred reaction mixture at 15° C. After the initial exotherm, this reaction mixture was heated on a water bath at 45–55° C. The following observations were made during the reaction time.

| Time (min.) | Temp. (° C.) | pH | Remarks |
| --- | --- | --- | --- |
| 0 | 10 | 1.4 | Before amine was added. |
| 2 | 26 | 4.1 | Just after amine was added. |
| 12 | 31 | 3.9 | Placed on heating bath. |
| 17 | 41 | 3.7 | |
| 20 | 45 | 3.6 | Solid pt. formed. |
| 23 | 49 | 3.5 | |
| 30 | 52 | 3.5 | |
| 40 | 52 | 3.6 | Much product visible. |
| 85 | 45 | 3.8 | |
| 135 | 47.5 | 3.85 | |
| 195 | 46.5 | 3.85 | |
| 285 | 47 | 3.90 | |
| 245 | 47 | 3.93 | Heat shut off. |
| Overnight | 25 | 3.93 | |

The product (ethylenediamine tetraacetonitrile) was separated from the resin by flotation (the product floated and could be decanted away from the resin). After hydrolysis with 40 grams of NaOH in 800 ml. of water until no more ammonia was evolved, the ethylenediamine tetracetic acid was recovered by acidifying the solution of the sodium salt. After recrystallization from methanol-$H_2O$, including a treatment with 10 grams of Darco G–60 charcoal, a quantitative yield of product was obtained which had an M.P. of 240° C. (dec.).

EXAMPLE III

Preparation of nitrilo triacetonitrile

To a mixture of hexamethylenetetramine (0.1 mole in 37.2 g. of $H_2O$) sulfonated cation exchange resin (Dowex 50 W–X8) in the acid form (in 0.4 eq., 225 ml. wet volume), and formaldehyde (0.78 mole, 64.6 g. of 36.2%) was added HCN(1.38 moles, 37.3 grams) while the solution was stirred and kept at about 55° C. for about 6 hours. The pH of the reaction mixture remained at about 1.7 to 2.0 during the course of the reaction. The reaction mixture was filtered to remove the mixture of resin and crystalline product. Most of the crystalline product, nitrilotriacetonitrile (M.P. 130–131° C.) was separated by adding water and decanting an aqueous slurry of the product. The yield of nitrilotriacetonitrile was 22.0 grams (separated by flotation) and 4.3 grams recovered by concentrating the water used in the flotation process. The total recovery was 26.3 grams, which represents a yield of 47.2% based on HMTA.

The above examples clearly indicate that substantial yields of amino nitriles may be readily prepared using the present invention.

We claim:
1. A process for preparing an aminonitrile, comprising:
 (a) agitating and reacting an aqueous mixture of;
  (i) a member selected from a first group consisting of ammonia, ethylenediamine, diethylene triamine, triethylene tetramine, propylene diamine, dipropylene triamine, tripropylene tetramine, benzylamine, 1,2-cyclohexene diamine, 1,2-cyclopentenyl diamine, hy- droxy ethyl ethylene diamine, N,N'-di(hydroxyethyl) ethylenediamine, aniline, toluidine, meta-hydroxy aniline, and hexamethylenetetramine; (ii) an excess of formaldehyde based on the member of the first group; (iii) an excess of HCN based on the member of the first group; (iv) an acidic ion exchange resin selected from the group consisting of a weakly acidic carboxylic polymethacrylate cation exchange resin and a strongly acid sulfonated polystyrene cation exchange resin, the resin being present in a ratio of about 0.1–4 equivalents per equivalent of the member of the first group; and (v) water, the water being present in a ratio of about 1–3 volumes per volume of combined formaldehyde, HCN, and the member of the first group, for about 30–500 minutes while maintaining the mixture at a temperature of about 0–150° C. to form the aminonitrile;

(b) separating the ion exchange resin from the reacted aqueous mixture, the resin being in the free acid form;

(c) recovering the separated ion exchange resin;

(d) separating the aminonitrile from the reacted aqueous mixture; and (e) recovering the separated aminonitrile.

2. The process of claim 1, in which the member of the first group is ethylenediamine and the aminonitrile is ethylenediaminetetraacetonitrile.

3. The process of claim 1, in which the member of the first group is hexamethylenetetramine and the aminonitrile is nitrilotriacetonitrile.

4. The process of claim 1, in which the formaldehyde and HCN are present in 1–20% mole excess based on the amine.

5. The process of claim 1, in which the acidic ion exchange resin is a weakly acidic carboxylic polymethacrylate cation exchange resin.

6. The process of claim 1, in which the acidic ion exchange resin is a weakly acidic carboxylic polymethacrylate cation exchange resin.

References Cited

UNITED STATES PATENTS 2,589,208  3/1952  Craig et al. _____ 260—465.5
3,256,314  6/1966  Dovell et al. _____ 260—465.5

JOSEPH P. BRUST, *Primary Examiner.*

U.S. Cl. X.R.

260—464, 465